United States Patent
Brewer et al.

(10) Patent No.: US 12,135,986 B2
(45) Date of Patent: Nov. 5, 2024

(54) PARALLEL FILE SYSTEM SCANS WITH MULTIPLE SHARED QUEUES

(71) Applicant: International Business Machines Corporation, Armonk, NY (US)

(72) Inventors: Scott Brewer, Tucson, AZ (US); Theodore Timothy Harris, Jr., Tucson, AZ (US); Sara Megan Coronado, Tucson, AZ (US); Raul E. Saba, Tucson, AZ (US); Drew Olson, Tucson, AZ (US); Joseph W. Dain, Vail, AZ (US); Gregory T. Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 16/952,307

(22) Filed: Nov. 19, 2020

(65) Prior Publication Data
US 2022/0156111 A1   May 19, 2022

(51) Int. Cl.
*G06F 9/48*     (2006.01)
*G06F 16/17*    (2019.01)
*G06F 16/182*   (2019.01)

(52) U.S. Cl.
CPC .............. *G06F 9/4881* (2013.01); *G06F 9/48* (2013.01); *G06F 9/4806* (2013.01); *G06F 9/4843* (2013.01); *G06F 16/1734* (2019.01); *G06F 16/182* (2019.01)

(58) Field of Classification Search
CPC ...... G06F 16/1734; G06F 9/48; G06F 9/4806; G06F 9/4843; G06F 9/4881; G06F 16/182
See application file for complete search history.

(56) References Cited

U.S. PATENT DOCUMENTS

| | | | |
|---|---|---|---|
| 7,127,446 B1 | 10/2006 | Menezes et al. | |
| 10,437,937 B2 | 10/2019 | Kilaru et al. | |
| 10,515,027 B2 | 12/2019 | Malkin et al. | |
| 10,585,802 B1 | 3/2020 | Singh et al. | |
| 2011/0040810 A1 | 2/2011 | Kaplan et al. | |
| 2018/0331897 A1* | 11/2018 | Zhang | G06N 20/00 |

(Continued)

FOREIGN PATENT DOCUMENTS

| | | |
|---|---|---|
| CN | 103324577 A | 9/2013 |
| CN | 107896248 A | 4/2018 |
| WO | 2013097248 A1 | 7/2013 |

OTHER PUBLICATIONS

PCT, Notification of Transmittal of The International Search Report and The Written Opinion of The International Searching Authority, or The Declaration for Application PCT/CN2021/128707 dated Jan. 28, 2022.

*Primary Examiner* — Charles M Swift
(74) *Attorney, Agent, or Firm* — Patterson + Sheridan, LLP

(57) ABSTRACT

A method includes scanning, by a device of a plurality of devices, a directory of a file system. The directory includes a plurality of subdirectories, and each device of the plurality of devices corresponds to a different queue of a plurality of queues. The method also includes inserting, by the device, a plurality of scanning tasks into a subset of the plurality of queues in a round robin fashion. The plurality of scanning tasks correspond to the plurality of subdirectories and responding to a scanning task of the plurality of scanning tasks includes scanning a subdirectory of the plurality of subdirectories.

14 Claims, 4 Drawing Sheets

(56) References Cited

U.S. PATENT DOCUMENTS

| | | |
|---|---|---|
| 2019/0347005 A1 | 11/2019 | Lamba et al. |
| 2020/0104170 A1* | 4/2020 | Else ........................ G06F 9/4887 |
| 2021/0081555 A1* | 3/2021 | Mungre ................. G06F 21/564 |

* cited by examiner

PARALLEL FILE SYSTEM SCANS WITH MULTIPLE SHARED QUEUES

BACKGROUND

The present invention relates to file systems, and more specifically, to scanning file systems. Users may store files in a file system, typically organized with directories and subdirectories. The users may scan the file system to gather data about the file system (e.g., number of files, size of the file system, available space on the file system, etc.). As the size of the file system grows, the scans may become more cumbersome and resource intensive.

One way to improve the speed of the scan is to implement multiple servers that scan portions of the file system. The servers may share a queue that holds scanning tasks that indicate the directories or subdirectories remaining to be scanned. Each server retrieves a scanning task from the queue and scans the directory indicated by the scanning task. If the server detects additional subdirectories during the scan, the server writes additional scanning tasks into the queue for the subdirectories. When the server completes a scanning task, the server may retrieve another scanning task from the queue and scan the indicated directory.

This process, however, may still include several inefficiencies and bottlenecks. For example, as the size of the queue grows, it becomes more cumbersome to add more scanning tasks to the queue. Additionally, if a server has many scanning tasks to add to the queue, the server may lock up the queue for a significant amount of time, which may prevent the other servers from retrieving scanning tasks from the queue or adding scanning tasks to the queue.

SUMMARY

According to one embodiment, a method includes scanning, by a device of a plurality of devices, a directory of a file system. The directory includes a plurality of subdirectories, and each device of the plurality of devices corresponds to a different queue of a plurality of queues. The method also includes inserting, by the device, a plurality of scanning tasks into a subset of the plurality of queues in a round robin fashion. The plurality of scanning tasks correspond to the plurality of subdirectories and responding to a scanning task of the plurality of scanning tasks includes scanning a subdirectory of the plurality of subdirectories. In this manner, each of the plurality of devices corresponds to its own queue from which it can retrieve scanning tasks, which removes the bottleneck created by having a singular, shared queue.

The method may include retrieving, by the device, a first scanning task from a queue of the plurality of queues corresponding to the device. The first scanning task indicates the directory. In this manner, the device may retrieve scanning tasks from its own queue. Additionally, the first scanning task may have been inserted into the queue by a second device of the plurality of devices.

The method may include advancing a pointer to a subsequent queue of the plurality of queues based on inserting a first scanning task of the plurality scanning tasks into a first queue of the plurality of queues and inserting, based on the pointer, a second scanning task of the plurality of scanning tasks into the subsequent queue. In this manner, the device may insert scanning tasks into queues of other devices.

The method may include logging a characteristic of the directory detected by scanning the directory. In this manner, the devices may track the results of the scans.

Each device of the plurality of devices may maintain a pointer to the plurality of queues. In this manner, each device may insert scanning tasks into the queues of other devices in a fair and balanced manner.

The method may include adding a characteristic of the directory detected by scanning the directory with a second characteristic of a subdirectory of the plurality of subdirectories detected by a second device of the plurality of devices by scanning the subdirectory. In this manner, the results of the scans performed by different devices may be aggregated.

According to an embodiment, a system includes a file system and a plurality of devices. The file system includes a directory and a plurality of subdirectories. The plurality of devices corresponds to a plurality of queues. A first device of the plurality of devices is configured to scan the directory and insert a plurality of scanning tasks into a subset of the plurality of queues in a round robin fashion. The plurality of scanning tasks correspond to the plurality of subdirectories. A second device of the plurality of devices is configured to retrieve a scanning task of the plurality of scanning tasks from a queue of the plurality of queues corresponding to the second device and in response to retrieving the scanning task, scan a subdirectory of the plurality of subdirectories corresponding to the scanning task. In this manner, each of the plurality of devices corresponds to its own queue from which it can retrieve scanning tasks, which removes the bottleneck created by having a singular, shared queue.

The first device may retrieve a first scanning task from a queue of the plurality of queues corresponding to the first device. The first scanning task indicates the directory. In this manner, the device may retrieve scanning tasks from its own queue. Additionally, the first scanning task may have been inserted into the queue corresponding to the first device by the second device.

The first device may advance a pointer to a subsequent queue of the plurality of queues based on inserting a first scanning task of the plurality scanning tasks into a first queue of the plurality of queues and insert, based on the pointer, a second scanning task of the plurality of scanning tasks into the subsequent queue. In this manner, the device may insert scanning tasks into queues of other devices.

DETAILED DESCRIPTION

This disclosure describes a file scanning system that shares the load of scanning a file system in a balanced manner across multiple scanning servers, in particular embodiments. Generally, the scanning servers implement their own task queues. Each scanning server can retrieve scanning tasks from its own task queue. The scanning tasks identify the locations of directories within the file system. After a scanning server retrieves a scanning task from its task queue, the scanning server begins scanning the directory identified by the scanning task. If the scanning server detects subdirectories during the scan, the scanning server inserts scanning tasks identifying those subdirectories into the task queues of other scanning servers in a round robin fashion. In this manner, the file scanning system can scan a file system using multiple scanning servers and distribute the workload in a balanced manner across the scanning servers in particular embodiments. As a result, it becomes less likely that a scanning server sits idle with no scanning tasks during the scan of the file system. Additionally, because the scanning servers insert scanning tasks into the queues of other scanning servers, it becomes less likely that the scanning queues will become long, which increases the time it takes to insert additional tasks into the queues. Moreover, it becomes less likely that the scanning servers will get locked up waiting for insertions to occur.

Figure 1:
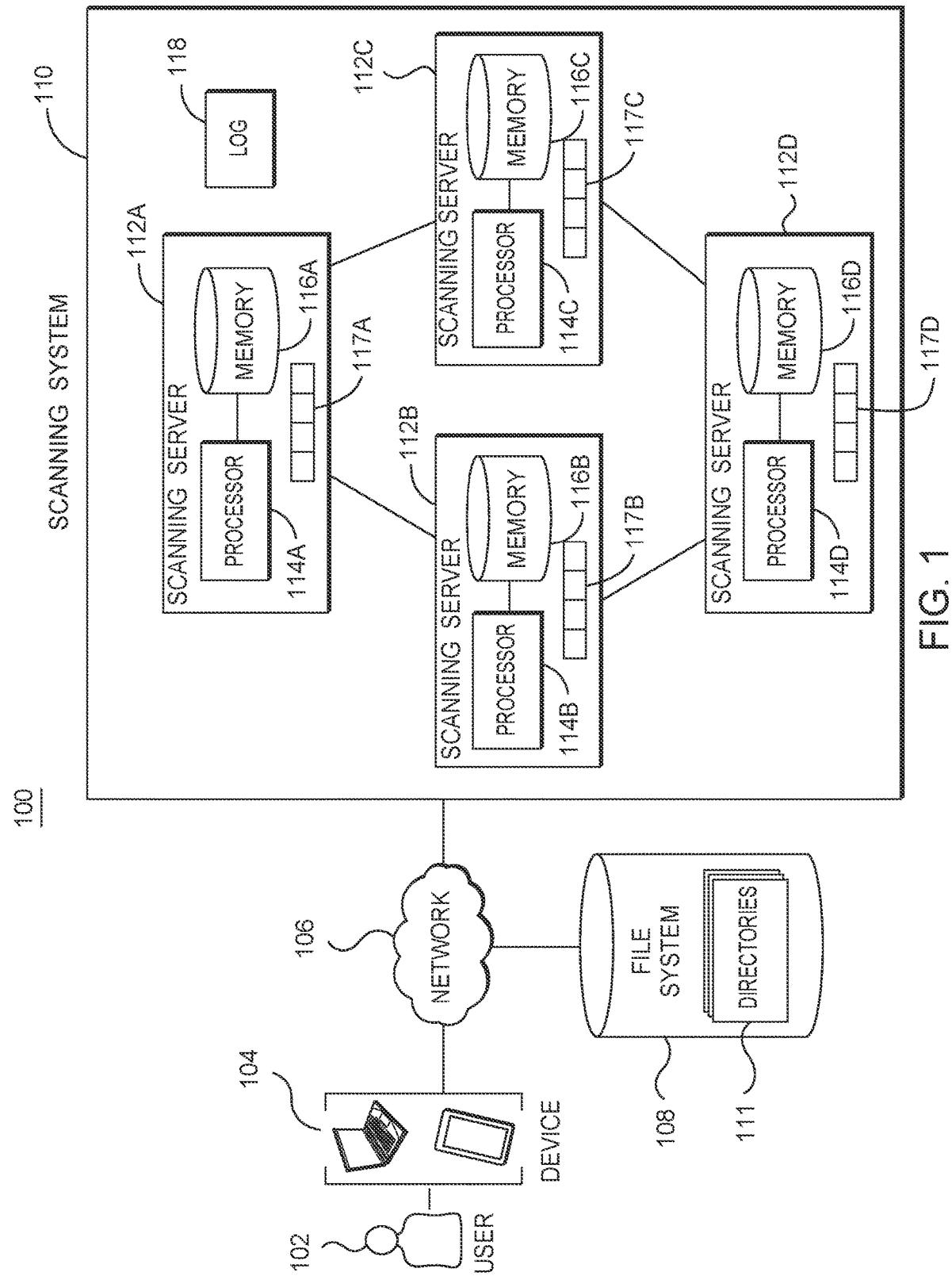
FIG. 1 illustrates an example system.

With reference now to FIG. 1, which shows an example system 100. As seen in FIG. 1, the system 100 includes one or more devices 104, a network 106, a file system 108, and a scanning system 110. Generally, the system 100 scans the file system 108 using multiple scanning servers. Each scanning server implements its own task queue. A scanning server may retrieve scanning tasks from its own task queue and scan a directory of the file system 108 indicated by the retrieved scanning task. If subdirectories are discovered during the scan, the scanning server then inserts scanning tasks corresponding to those subdirectories into the task queues of the other scanning servers in a round robin fashion. As a result, the scanning servers distribute scanning tasks in a balanced manner across the scanning servers, in particular embodiments.

A user 102 may use a device 104 to communicate with other components of the system 100. For example, the user 102 may use the device 104 to communicate a command to the scanning system 110 to begin scanning the file system 108. As another example, the device 104 may receive the results of scanning the file system 108 from the scanning system 110. The device 104 includes any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may also include a user interface, such as a display, a microphone, keypad, or other appropriate terminal equipment usable by the user 102. The device 104 may include a hardware processor, memory, or circuitry configured to perform any of the functions or actions of the device 104 described herein. For example, a software application designed using software code may be stored in the memory and executed by the processor to perform the functions of the device 104.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The file system 108 stores files that can be used or scanned by other components in the system 100. The file system 108 may be any suitable file system configured to store files. The files in the file system 108 may be organized using directories 112. The directories 112 may be visualized as folders containing groupings of files. The directories 112 may also hold additional directories referred to as subdirectories. Each directory 112 may hold any suitable number of files and subdirectories. The file system 108 may include a root directory from which all other directories 112 branch.

The file system 108 may be scanned to determine certain characteristics of the file system 108, directories 112, or the files within the file system 108. For example, the file system 108 may be scanned to determine the number of files stored in the file system 108. As another example, the file system 108 may be scanned to determine the capacity, size, or available space within the file system 108. As the file system 108 stores more files and directories 112, it may become more cumbersome and resource intensive to scan the file system 108.

The scanning system 110 may scan the file system 108 using multiple scanning servers 112. The scanning servers 112 implement a queueing system that distributes the load of scanning the file system 108 in a balanced manner across the scanning servers 112, in particular embodiments. Generally, each scanning server 112 implements its own task queue 117. A scanning server 112 may perform scanning tasks from its own queue 117. If a subdirectory is detected during the scan, then the scanning server 112 inserts scanning tasks for those subdirectories into the queues 117 of other scanning servers 112 in a round robin fashion. As a result, each scanning server 112 performs scans based on scanning tasks in its own queue 117, but inserts additional scanning tasks into the queues 117 of other scanning servers 112.

The scanning system 110 may include any suitable number of scanning servers 112. In the example of FIG. 1, the scanning system 110 includes four scanning servers 112A, 112B, 112C and 112D. Each scanning server 112 may be implemented in its own physical device. In some embodiments, multiple scanning servers 112 may be implemented in the same physical device. For example, the scanning servers 112 may share hardware resources of the same physical device. The scanning servers 112 may include processors 114 and memories 116, which are configured to perform any of the functions or actions of the scanning servers 112 described herein. In the example of FIG. 1, the scanning server 112A includes a processor 114A and a memory 116A. The scanning server 112B includes a processor 114B and a memory 116B. The scanning server 112C includes a processor 114C and a memory 116C. The scanning server 112D includes a processor 114D and a memory 116D. In some embodiments, any number of the processors 114 and memories 116 may be the same, shared processor 114 or memory 116 of a singular device. Additionally, the scanning server 112A maintains a task queue 117A. The scanning server 112B maintains a task queue 117B. The scanning server 112C maintains a task queue 117C. The scanning server 112D maintains a task queue 117D.

The processor 114 is any electronic circuitry, including, but not limited to microprocessors, application specific integrated circuits (ASIC), application specific instruction set processor (ASIP), and/or state machines, that communicatively couples to memory 116 and controls the operation of the scanning server 112. The processor 114 may be 8-bit, 16-bit, 32-bit, 64-bit or of any other suitable architecture. The processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 114 may include other hardware that operates software to control and process information. The processor 114 executes software stored on memory to perform any of the functions described herein. The processor 114 controls the operation and administration of the scanning server 112 by processing information (e.g., information received from the devices 104, network 106, and memory 116). The processor 114 may be a programmable logic device, a microcontroller, a microprocessor, any suitable processing device, or any suitable combination of the preceding. The processor 114 is not limited to a single processing device and may encompass multiple processing devices.

The memory 116 may store, either permanently or temporarily, data, operational software, or other information for the processor 114. The memory 116 may include any one or a combination of volatile or non-volatile local or remote devices suitable for storing information. For example, the memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 116, a disk, a CD, or a flash drive. In particular embodiments, the software may include an application executable by the processor 114 to perform one or more of the functions described herein.

As a scanning server 112 scans a particular directory 112 in the file system 108, the scanning server 112 may detect characteristics of the files or subdirectories within that directory 112. These characteristics may include the number of files, the size of the directory 112, the size of the files, the creation data of the files, etc. The scanning server 112 may log these detected characteristics into a log 118. The log 118 may be communicated to the device 104 after the scanning servers 112 have completed scanning the file system 108, so that the user 102 or the device 104 may review the detected characteristics of the file system 108. In certain embodiments, the scanning servers 112 may add detected characteristics across different directories 112 of the file system 108 in the log 118. For example, a scanning server 112 may determine that one directory 112 holds five files, and another scanning server 112 may detect that another directory 112 holds three files. The scanning servers 112 may add the number of detected files and log that the file system 108 holds eight files. The scanning servers 112 may continue to add to this number a number of detected files in other directories 112 as the scan of the file system 108 continues.

Figure 2:
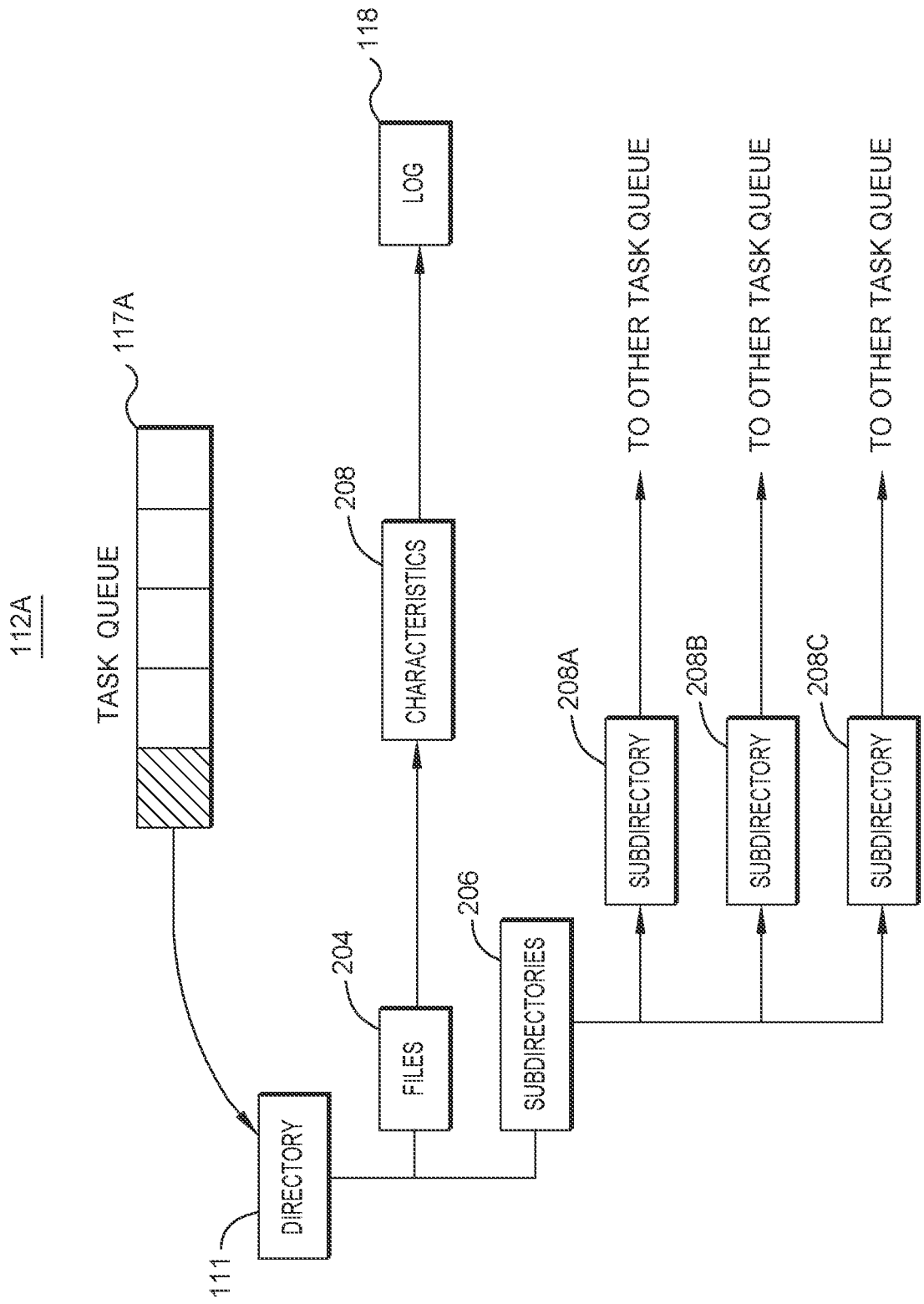
FIG. 2 illustrates an example scanning server of the system of FIG. 1.

FIG. 2 illustrates an example scanning server 112A of the system 100 of FIG. 1. Generally, the scanning server 112A scans a directory 112 of the file system 108 to determine characteristics of files within the directory 112. If the scanning server 112A detects subdirectories within the directory 112, then the scanning server 112A inserts scanning tasks corresponding to those subdirectories into the task queues of other scanning servers 112 in a round robin fashion. In this manner the scanning server 112A distributes the load of scanning the file system 108 in a balanced manner across the scanning servers 112, in particular embodiments.

The task server 112A implements a task queue 117A. The task queue 117A holds scanning tasks that correspond to directories 112 of the file system 108. For example, each scanning task may indicate the location of a directory 112 in the file system 108. The scanning server 112A may retrieve the scanning task from the task queue 117A in a first in first out manner. The scanning server 112A may then locate the directory 112 corresponding to that scanning task and begin scanning that directory 112.

The scanning tasks in the task queue 117A may have been placed there by other scanning servers 112 in the scanning system 110. For example, when other scanning servers 112 detect subdirectories in the directories 112 that the other scanning servers 112 are scanning, the other scanning servers 112 may insert scanning tasks into the task queue 117A.

In the example of FIG. 2, the scanning server 112A retrieves a scanning task from the head of the task queue 117A. The scanning task identifies a location of a directory 112 within the file system 108. Based on the scanning task, the scanning server 112A scans the directory 112 in the file system 108 and detects files 204 and subdirectories 206. The scanning server 112A scans the files 204 to determine characteristics 208 of those files 204. For example, the scanning server 112A may determine the size of the files 204 or the number of files 204. The scanning server 112A may then log these characteristics 208 in the log 118.

The scanning server 112A may detect the subdirectories 206 by scanning the directory 112. In the example of FIG. 2, the scanning server 112A determines that the directory 112 holds subdirectories 208A, 208B and 208C. In response, the scanning server 112A may insert scanning tasks corresponding to the subdirectories 208 into the task queues 117 of other scanning servers 112 in round robin fashion. As a result, the other scanning servers 112 scan these subdirectories 208.

When a scan of the file system 108 is initially requested, the scanning system 110 may initialize the scan by placing the root directory of the file system 108 into the task queue 117 of the scanning server 112A. The scanning server 112A may then scan the root directory to detect the subdirectories within the root. The scanning server 112 may then insert scanning tasks into the queues of the other scanning servers 112 corresponding to these subdirectories. The other scanning servers 112 may then begin scanning the subdirectories of the root directory.

Figure 3:
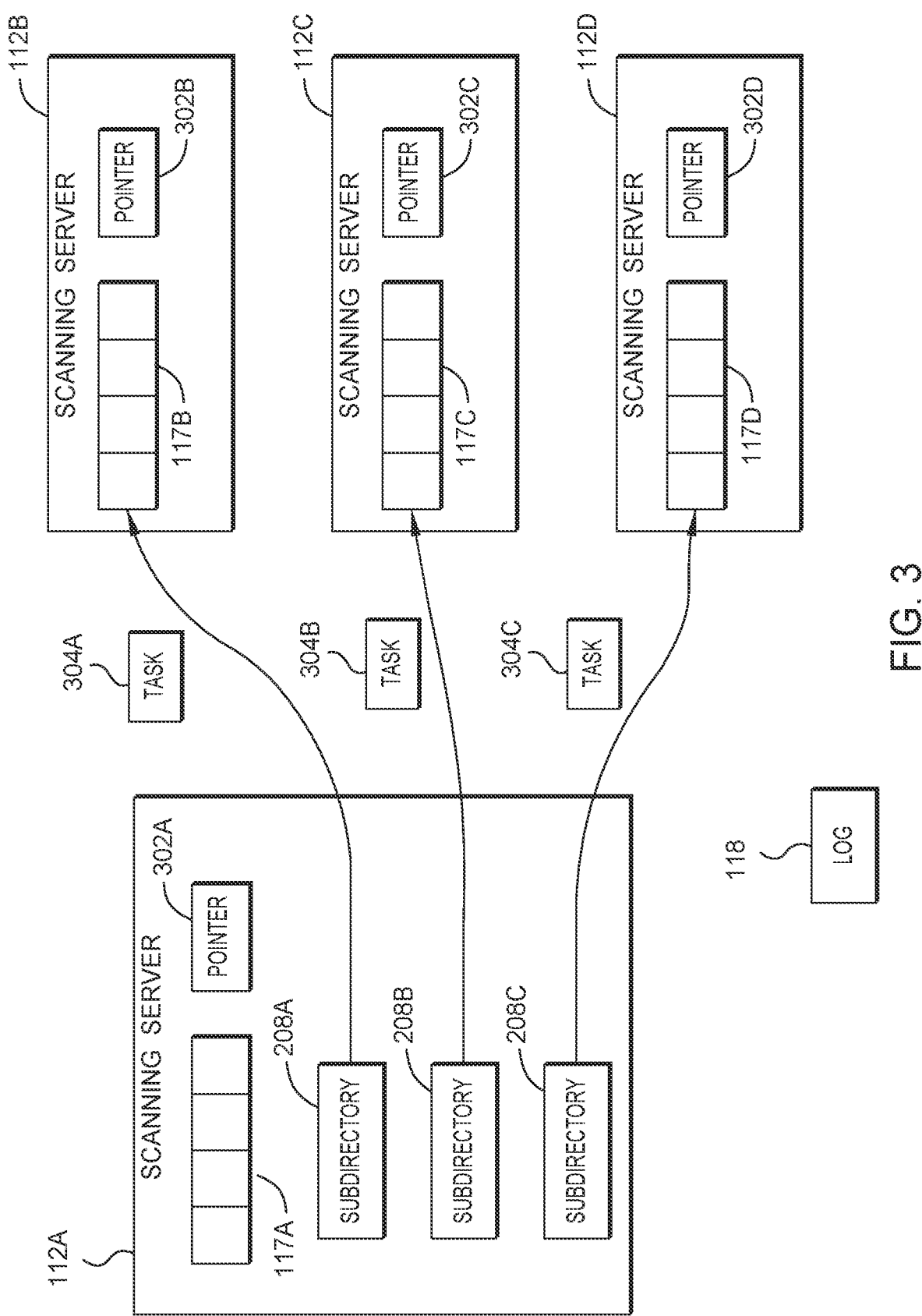
FIG. 3 illustrates example scanning servers of the system of FIG. 1.

FIG. 3 illustrates examples of scanning servers 112 of the system 100 of FIG. 1. As seen in FIG. 3, the scanning server 112A inserts scanning tasks corresponding to the subdirectories 208A, 208B and 208C into the task queues 117 of other scanning servers 112. In this manner, the scanning server 112A distributes the load of scanning the subdirectories 208A, 208B and 208C in a balanced manner across the scanning servers 112, in particular embodiments.

The scanning server 112A maintains a pointer 302A that points to the task queues 117 of the other scanning servers 112 and the scanning system 110. The pointer 302A allows the scanning server 112A to insert scanning tasks into other task queues 117 in a round robin fashion. For example, the pointer 302A points to the next task queue in the round robin rotation. After the scanning server 112A inserts a scanning task into that task queue 117, the scanning server 112A advances the pointer 302A to the next task queue 117 in the round robin rotation.

Each scanning server 112 may maintain its own pointer 302 that points to the next task queue 117 in that scanning server's 112 round robin rotation. The pointers 302 for the different scanning servers 112 may point to different task queues 117, depending on where a particular scanning server 112 is in its round robin rotation. In the example of FIG. 3, the scanning server 112B maintains a pointer 302B, the scanning server 112C maintains a pointer 302C, and the scanning server 112D maintains a pointer 302D.

The scanning server 112A inserts scanning tasks 304 corresponding to the subdirectories 208 into the task queues 117 of the other scanning servers 112 in a round robin fashion. In the example of FIG. 3, the scanning server 112A inserts a scanning task 304A corresponding to the subdirectory 208A into the task queue 117B of the scanning server 112B. The scanning server 112A may have inserted the scanning task 304A into the task queue 117B because the pointer 302A was pointing to the task queue 117B. After inserting the task 304A into the task queue 117B, the scanning server 112A advances the pointer 302A to point to the task queue 117C of the scanning server 112C. The scanning server 112A then inserts a scanning task 304B corresponding to the subdirectory 208B into the task queue 117C of the scanning server 112C. The scanning server 112A then advances the pointer 302A to the task queue 117D of the scanning server 112D. The scanning server 112A then inserts a scanning task 304C corresponding to the subdirectory 208C into the task queue 117D of the scanning server 112D. The scanning server 112A then advances the pointer 302A to point back to the task queue 117B of the scanning server 112B. As seen in this example, the scanning server 112A does not direct the pointer 302A to point to the task queue 117A. As a result, the scanning server 112A may not insert scanning tasks 304 into its own task queue 117A. Rather, the scanning server 112A inserts scanning tasks 304 into the task queues 117 of the other scanning servers 112. Likewise, the other scanning servers 112 insert scanning tasks 304 into the task queues 117 of other scanning servers 112, and not their own scanning queues 117. In some embodiments, the scanning servers 112 may advance their pointers 302 to point to their own task queues 117.

After inserting the scanning tasks 304 into the task queues 117 of the other scanning servers 112, the other scanning servers 112 may retrieve these scanning tasks 304 from their task queues 117 and scan the subdirectories 208A, 208B and 208C. As a result, the load of scanning the subdirectories 208A, 208B and 208C is distributed in a balanced manner across the other scanning servers 112.

As the scanning servers 112 scan the directories 112 and subdirectories 208, the scanning servers 112 may log the characteristics 208 of the files 204 within the directories 112 and subdirectories 208 in log 118. In particular embodiments, the scanning servers 112 may add certain detected characteristics across different directories 112 and subdirectories 208 within the log 118. For example, a characteristic 208 within the log 118 may be a total number of files 204 stored within the file system 108. The scanning servers 112 may continuously add a number of files 204 detected within a directory 112 or subdirectory 208 to this characteristic 208 in the log 118 to update the total number of detected files 204 within the file system 108. After the scanning servers 112 complete scanning the file system 108, one or more of the scanning servers 112 may communicate the log 118 to the device 104 to present the results of the scan.

Figure 4:
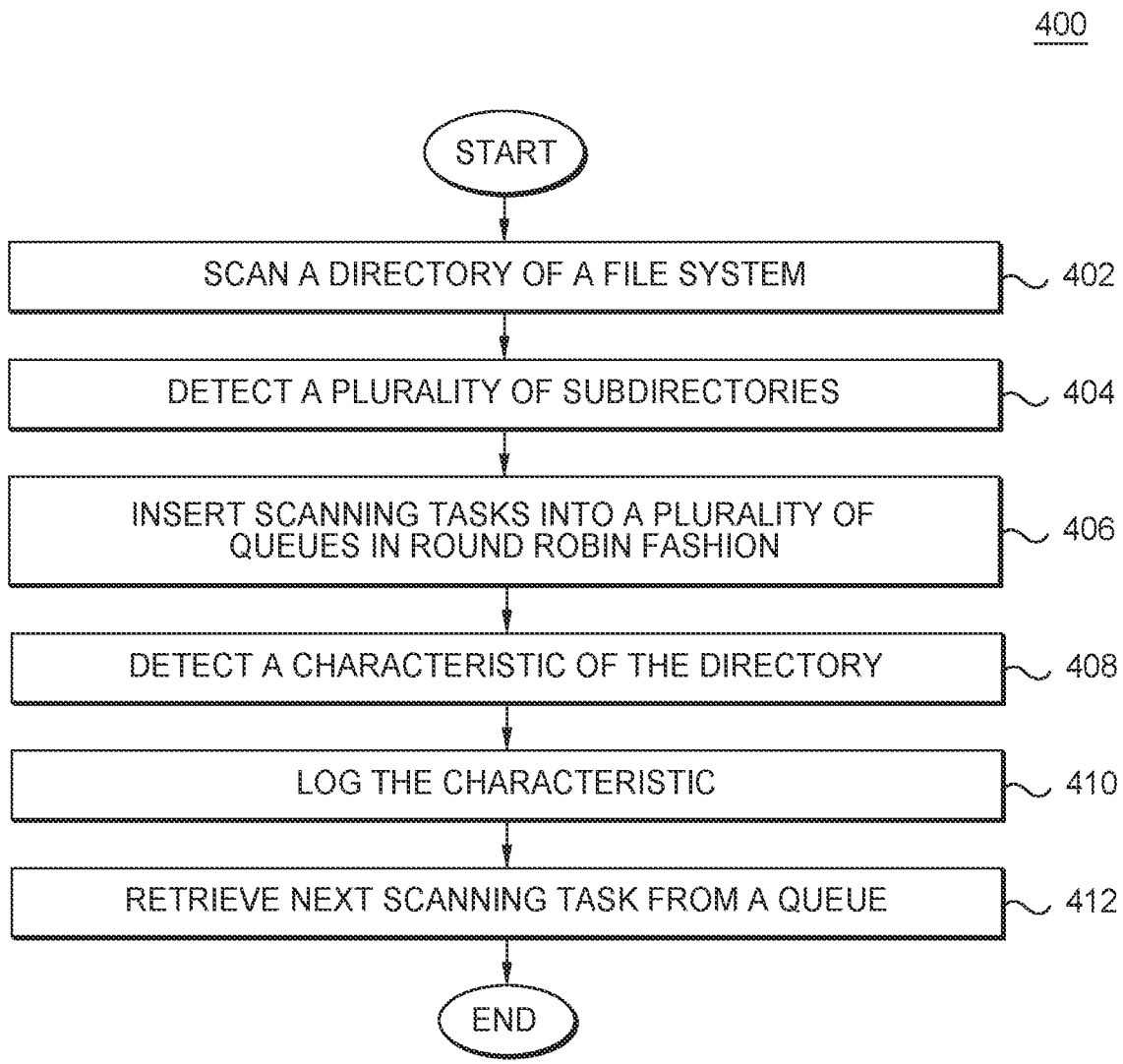
FIG. 4 illustrates an example method in the system of FIG. 1.

FIG. 4 illustrates an example method 400 in the system 100 of FIG. 1. Generally, a scanning server 112 performs the steps of the method 400. In particular embodiments, by performing the method 400, the load of scanning a file system 108 is distributed across multiple scanning servers 112 in a balanced manner.

In step 402, the scanning server 112 scans a directory 112 of a file system 108. The scanning server 112 may have scanned the directory 112 in response to retrieving a scanning task 304 from a task queue 117 of the scanning server 112 (e.g., its own task queue). The scanning task 304 may identify a location of the directory 112 in the file system 108.

In step 404, the scanning server 112 detects a plurality of subdirectories 208 when scanning the directory 112. In step 406, the scanning server 112 inserts scanning tasks 304 into a plurality of task queues 117 in a round robin fashion. For example, the scanning server 112 may maintain a pointer 302 that points to the next task queue 117 in the round robin rotation. The scanning server 112 may generate a scanning task 304 corresponding to a subdirectory 208 and insert that scanning task 304 into the task queue 117 to which the pointer 302 is pointing. After inserting that scanning task 304, the scanning server 112 advances the pointer 302 to the next task queue 117 in the round robin rotation. The scanning server 112 then creates another scanning task 304 for the next subdirectory 208 and inserts that scanning task 304 into the next task queue 117. These task queues 117 may belong to other scanning servers 112 in the scanning system 110. As a result, the scanning server 112 may insert scanning tasks 304 into the task queues 117 of other scanning servers 112, but not into its own task queue 117.

During the scan, the scanning server 112 may detect a characteristic 208 of the directory 112 in step 408. The characteristic 208 may be of the directory 112 or of one or more files 204 stored within the directory 112. The characteristic 208 may be any suitable characteristic of the directory 112 or the files 204. For example, the characteristic 208 may be a number of files stored within the directory 112, a size of the files 204, or creation date of the files 204. The scanning system 110 and the scanning servers 112 may detect other characteristics 208 that are defined by a user 102. For example, the user 102 may want to know the number of files 204 that have a file name that begins with the letter 'B.' In response, the scanning server 112 may detect the number of files 204 in the directory 112 that begin with the letter 'B,' and detect that number as the characteristic 208.

In step 410, the scanning server 112 logs the detected characteristic 208 in a log 118. In particular embodiments the scanning servers 112 in the scanning system 110 may add detected characteristics 208 across multiple directories 112 in the log 118.

The scanning server 112 retrieves the next scanning task 304 from its task queue 117 after finishing the scan of the directory 112. The next scanning task 304 may have been inserted into the task queue 117 by another scanning server 112 and may identify another directory 112 within the file system 108. In response to that scanning task 304 the scanning server 112 may begin scanning the next directory 112 in the file system 108.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
    scanning, by a first device of a plurality of devices, a directory of a file system, wherein the directory comprises a plurality of subdirectories, and wherein each device of the plurality of devices stores to a different queue of a plurality of queues;
    in response to detecting, by the first device, the plurality of subdirectories when scanning the directory, inserting, by the first device, a plurality of scanning tasks into a subset of the plurality of queues in a round robin fashion, wherein the plurality of scanning tasks indicates locations of the plurality of subdirectories, wherein responding to a scanning task of plurality of scanning tasks comprises scanning a subdirectory of the plurality of subdirectories;
    retrieving, by a second device of the plurality of devices, a first scanning task of the plurality of scanning tasks from a first queue of the subset of the plurality of queues, wherein the first queue is stored by the second device and wherein the first scanning task indicates a location of a first subdirectory of the directory;
    scanning, by the second device, the first subdirectory of the plurality of subdirectories based on the location of the first subdirectory indicated by the first scanning task;
    in response to detecting, by the second device, a second subdirectory of the first subdirectory when scanning the first subdirectory, inserting, by the second device, a second scanning task into a second queue of the plurality of queues, wherein the second scanning task indicates a location of the second subdirectory of the first subdirectory;
    retrieving, by the first device and from the second queue, the second scanning task; and
    scanning, by the first device, the second subdirectory of the first subdirectory based on the location of the second subdirectory indicated by the second scanning task.

2. The method of claim 1, further comprising:
    advancing a pointer to a subsequent queue of the plurality of queues based on inserting a third scanning task of the plurality of scanning tasks into a third queue of the plurality of queues; and
    inserting, based on the pointer, a fourth scanning task of the plurality of scanning tasks into the subsequent queue.

3. The method of claim 1, further comprising logging a characteristic of the directory detected by scanning the directory.

4. The method of claim 1, wherein each device of the plurality of devices maintains a pointer to the plurality of queues.

5. The method of claim 1, further comprising adding a characteristic of the directory detected by scanning the directory with a second characteristic of a subdirectory of the plurality of subdirectories detected by the second device of the plurality of devices by scanning the subdirectory.

6. The method of claim 1, wherein inserting the plurality of scanning tasks is performed in response to detecting the plurality of subdirectories when scanning the directory.

7. An apparatus comprising:
    a memory; and
    a hardware processor communicatively coupled to the memory, the hardware processor configured to:
        scan, by a first device of a plurality of devices, a directory of a file system, wherein the directory comprises a plurality of subdirectories, and wherein each device of the plurality of devices stores a different queue of a plurality of queues; and
        in response to detecting, by the first device, the plurality of subdirectories when scanning the directory, insert, by the first device, a plurality of scanning tasks into a subset of the plurality of queues in a round robin fashion, wherein the plurality of scanning tasks indicates locations of the plurality of subdirectories, wherein responding to a scanning task of the plurality of scanning tasks comprises scanning a subdirectory of the plurality of subdirectories, wherein a second device of the plurality of devices retrieves a first scanning task of the plurality of scanning tasks from a first queue of the plurality of queues, wherein the first scanning task indicates a location of a first subdirectory of the directory, wherein the second device scans the first subdirectory of the plurality of subdirectories based on the location of the first subdirectory indicated by the first scanning task, and wherein the first queue is stored by the second device;
        retrieve, by the first device and from a second queue of the plurality of queues, a second scanning task inserted into the first queue by the second device in response to detecting, by the second device, the second subdirectory of the first subdirectory when scanning the first subdirectory, wherein the second scanning task indicates a location of the second subdirectory of the first subdirectory; and
        scan, by the first device, the second subdirectory of the first subdirectory based on the location of the second subdirectory indicated by the second scanning task.

8. The apparatus of claim 7, the hardware processor is further configured to:
    advance a pointer to a subsequent queue of the plurality of queues based on inserting a third scanning task of the plurality of scanning tasks into a third queue of the plurality of queues; and
    insert, based on the pointer, a fourth scanning task of the plurality of scanning tasks into the subsequent queue.

9. The apparatus of claim 7, the hardware processor is further configured to log a characteristic of the directory detected by scanning the directory.

10. The apparatus of claim 7, wherein each device of the plurality of devices maintains a pointer to the plurality of queues.

11. The apparatus of claim 7, the hardware processor is further configured to add a characteristic of the directory detected by scanning the directory with a second characteristic of a subdirectory of the plurality of subdirectories detected by the second device of the plurality of devices by scanning the subdirectory.

12. The apparatus of claim 7, wherein inserting the plurality of scanning tasks is performed in response to detecting the plurality of subdirectories when scanning the directory.

13. A system comprising:
- a file system comprising a directory and a plurality of subdirectories of the directory; and
- a plurality of devices corresponding to a plurality of queues, wherein a first device of the plurality of devices is configured to:
  - scan the directory; and
  - in response to detecting the plurality of subdirectories when scanning the directory, insert a plurality of scanning tasks into a subset of the plurality of queues in a round robin fashion, wherein the plurality of scanning tasks indicates locations of the plurality of subdirectories;
- wherein a second device of the plurality of devices is configured to:
  - retrieve a first scanning task of the plurality of scanning tasks from a first queue of the plurality of queues stored by the second device, wherein the first scanning task indicates a location of a first subdirectory of the directory;
  - scan the first subdirectory of the plurality of subdirectories based on the location of the first subdirectory indicated by the first scanning task;
  - in response to detecting a second subdirectory of the first subdirectory when scanning the first subdirectory, insert a second scanning task into a second queue of the plurality of queues, wherein the second scanning task indicates a location of the second subdirectory of the first subdirectory; and
- wherein the first device is further configured to:
  - retrieve, from the second queue, the second scanning task; and
  - scan the second subdirectory of the first subdirectory based on the location of the second subdirectory indicated by the second scanning task.

14. The system of claim 13, the first device further configured to:
- advance a pointer to a subsequent queue of the plurality of queues based on inserting a third scanning task of the plurality of scanning tasks into a third queue of the plurality of queues; and
- insert, based on the pointer, a fourth scanning task of the plurality of scanning tasks into the subsequent queue.

* * * * *